US008149706B2

(12) United States Patent
Turlington et al.

(10) Patent No.: US 8,149,706 B2
(45) Date of Patent: Apr. 3, 2012

(54) METHOD AND SYSTEM FOR ADJUSTING BANDWIDTH USING MULTIPLE TIMERS

(75) Inventors: Matthew W. Turlington, Richardson, TX (US); Scott R. Kotrla, Wylie, TX (US); Christopher N. DelRegno, Rowlett, TX (US); Michael U. Bencheck, Richardson, TX (US); Richard C. Schell, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 165 days.

(21) Appl. No.: 12/168,696

(22) Filed: Jul. 7, 2008

(65) Prior Publication Data
US 2010/0002724 A1    Jan. 7, 2010

(51) Int. Cl.
    *H04J 3/14*         (2006.01)
(52) U.S. Cl. ......... 370/233; 370/252; 709/224; 709/226
(58) Field of Classification Search .................. 370/230, 370/230.1, 231–234, 235, 235.1, 465, 468, 370/477, 241–253; 709/225, 226, 232, 233, 709/234, 223, 224
See application file for complete search history.

(56) References Cited

U.S. PATENT DOCUMENTS

| | | | | |
|---|---|---|---|---|
| 5,892,754 A * | 4/1999 | Kompella et al. | ............. | 370/252 |
| 6,278,694 B1 * | 8/2001 | Wolf et al. | ..................... | 370/253 |
| 6,377,554 B1 * | 4/2002 | Farnsworth et al. | .......... | 370/468 |
| 7,068,647 B2 * | 6/2006 | Fangman et al. | ............. | 370/465 |
| 7,461,173 B2 * | 12/2008 | Sen et al. | ....................... | 709/223 |
| 7,551,623 B1 * | 6/2009 | Feroz et al. | ................... | 709/224 |
| 7,631,075 B2 * | 12/2009 | Mongiovi | ..................... | 709/224 |
| 2002/0150048 A1 * | 10/2002 | Ha et al. | ........................ | 370/231 |
| 2003/0187998 A1 * | 10/2003 | Petit | .............................. | 709/226 |
| 2004/0240385 A1 * | 12/2004 | Boggs et al. | .................. | 370/230 |
| 2005/0195741 A1 * | 9/2005 | Doshi et al. | ................... | 370/230 |
| 2010/0083263 A1 * | 4/2010 | Machida | ........................ | 709/224 |

* cited by examiner

*Primary Examiner* — Jeffrey M Rutkowski

(57) ABSTRACT

An approach is provided for auto-bandwidth adjusting bandwidth allocations for traffic-engineered tunnels used to carry traffic along a network. Traffic over the tunnel is sampled at a first interval period and at a second interval period, where the second interval period is shorter than the first interval period. A determination is made as to whether the sampled traffic taken using the second interval period is greater than the bandwidth allocation, and the bandwidth allocation is adjusted upward based upon a determination that the sampled traffic taken using the second interval period is greater than the bandwidth allocation. Also, a determination can be made as to whether the sampled traffic taken using the first interval period is less than the bandwidth allocation, and the bandwidth allocation can be adjusted downward based upon a determination that the sampled traffic taken using the first interval period is less than the bandwidth allocation.

21 Claims, 5 Drawing Sheets

METHOD AND SYSTEM FOR ADJUSTING BANDWIDTH USING MULTIPLE TIMERS

BACKGROUND OF THE INVENTION

Telecommunications networks have developed from connection-oriented, circuit-switched (CO-CS) systems, e.g., such as the public switched telephone network (PSTN), utilizing constant bit-rate, predefined point-to-point connections to connectionless, packet-switched (CNLS) systems, such as the Internet, utilizing dynamically configured routes characterized by one or more communication channels divided into arbitrary numbers of variable bit-rate channels. With the increase in demand for broadband communications and services, telecommunications service providers are beginning to integrate long-distance, large-capacity optical communication networks with these traditional CO-CS and CNLS systems. Typically, these optical communication networks utilize multiplexing transport techniques, such as time-division multiplexing (TDM), wavelength-division multiplexing (WDM), and the like, for transmitting information over optical fibers. However, an increase in demand for more flexible, resilient transport is driving optical communication networks toward high-speed, large-capacity packet-switching transmission techniques, wherein switching and transport functions occur in optical states via one or more packets.

Such optical communication networks can experience significant fluctuations in traffic due to many factors, such as increases or decreases in the number of customers allocated to use the network and/or components of the network, changes in the structure of the network that increase or decrease capacity of the network and/or of components of the network, and fluctuations in usage that can be somewhat predictable or cyclical in nature, as well as random or bursty in nature. Typically, if the amount of traffic attempting to use resources of the optical communication network allocated thereto exceeds the capacity of the allocated resources, then excess data will be lost until the situation is resolved.

Hence, with these broadband systems, despite the availability of large amounts of bandwidth, poor bandwidth management can result in the inefficient use of bandwidth. Traditional systems allocate bandwidth at regular time intervals to reflect traffic fluctuations. In such static systems, a situation can arise where, as the bandwidth increases during a normal day, traffic-engineered tunnels increase in size. However, there may be some sampling periods in which the bandwidth needs are momentarily diminished, resulting in an undesired decrease in bandwidth. During such time, excess traffic would be discarded (such correction cannot be made until the next time interval).

Therefore, there is a need for an approach that adjusts bandwidth allocations in response to traffic fluctuations.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for providing automatic bandwidth adjustments in response to traffic fluctuations over packet-based networks are described in this document. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various exemplary embodiments are described with respect to label switching networks, it is contemplated that the various exemplary embodiments are also applicable to other equivalent transport networks, such as circuit-switched, burst-switched, packet-switched, wavelength-switched, multi-protocol label-switched, etc., networks.

Figure 1:
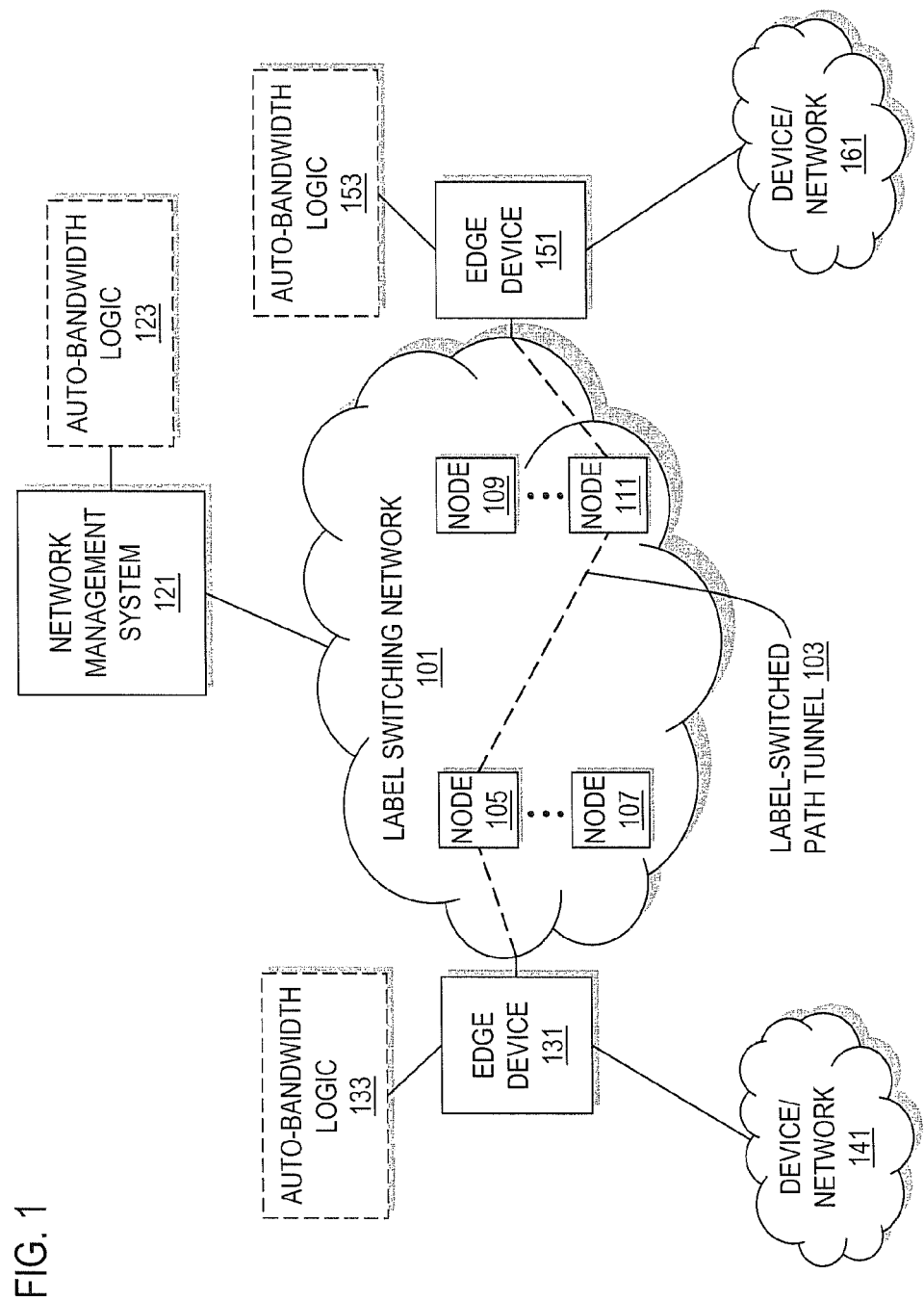
FIG. 1 is a system diagram of a label switching network utilizing auto-bandwidth logic to adjust label-switched path tunnels, according to an exemplary embodiment.

FIG. 1 is a system diagram of a label switching network 101 utilizing auto-bandwidth logic to adjust label-switched path tunnels or traffic-engineered tunnels (e.g., label-switched path tunnel 103), according to an exemplary embodiment. The label switching network 101 includes a plurality of nodes (e.g., label switching routers) 105, 107, 109, 111, etc., that are used to route communications between a device and/or network 141 and a device and/or network 161 by establishing a label-switched path tunnel 103 (e.g., from node 105 to node 111 in this exemplary instance). Thus, for example, when device/network 141 requests establishment of communications with device/network 161, an edge device (e.g., a label edge ingress/egress router) 131 provides a connection between the device/network 141 and one of the nodes, such as nodes 105, 107, etc., which provide the label-switched path tunnel 103 to another node, such as nodes 109, 111, etc. An edge device (e.g., a label edge ingress/egress router) 151 provides a connection between the node (i.e., node 109, 111, etc.) acting as the egress node for the label-switched path tunnel 103 and the device/network 161. Note that the edge devices 131 and 151 can be provided as components of the label switching network 101, at respective device/networks, or as separate components from the networks depicted.

The label switching network 101 includes a network management system 121 that can be used to monitor, analyze and control the operation of the label switching network 101. As noted previously, auto-bandwidth logic (e.g., auto-bandwidth logic 123, auto-bandwidth logic 133, and/or auto-bandwidth logic 153) is provided to adjust label-switched path tunnels. The auto-bandwidth logic can be provided, for example, as auto-bandwidth logic 123 component of the network management system 121, and/or as auto-bandwidth logic 133 and 153 as components of the edge devices 131 and 151, respectively. If provided as auto-bandwidth logic 123 as a component of the network management system 121, then the auto-bandwidth logic 123 can be used to control one or more of the edge device(s) used in conjunction with the label switching network 101.

As an example of the auto-bandwidth logic, a label switching network could be configured as a multi-protocol label switching (MPLS) network, and the MPLS network can be provided with an MPLS auto-bandwidth logic that automatically sizes the label switched paths (LSPs) in the MPLS network based on demand, instead of based upon pre-provisioning in advance. For example, it is possible for the auto-bandwidth logic to use an algorithm that triggers an auto-bandwidth resizing function based on connection admission control (CAC) for Layer 2 circuits or via traffic sampling for Layer 3 (IP) and virtual private LAN (local area network) service (VPLS) traffic. Such algorithms can monitor traffic as compared to bandwidth allocations and make adjustments to the bandwidth allocations as needed. However, such a system can be problematic if the triggering of the monitoring of traffic and comparison with current allocations is performed using a single timer.

In a configuration utilizing a single timer, the system would sample the traffic to check whether the traffic flow rate is greater than, less than, or equal to the current bandwidth allocation at regular intervals as determined by the single timer, and make adjustments as needed based on that sampled value. A shorter interval time period will yield greater accuracy of each adjustment; however, this accuracy should also be weighed against the added burden on the system caused by the resulting larger number of monitoring steps, analysis steps, and control steps performed by the system. Regardless of the length of the interval time period, there will be some degree of lag-time between traffic fluctuations that occur immediately following the beginning of the interval time period and the expiration of the interval time period, when adjustments will be made. Such lag-time can cause some under-utilization of the allocated bandwidth for decreases in traffic, and such lag-time can cause a loss of data during periods in which the traffic exceeds the current bandwidth allocation. Also, due to the burstiness of network traffic, if the interval time period is made too long, then there arises the possibility that the sample taken will not be representative of the entire interval. For example, during a period of relatively consistent high traffic, if a temporary sharp drop in traffic occurs when the traffic flow rate is sampled and then the traffic returns to the high level, the auto-bandwidth adjustment algorithm will downwardly drop the bandwidth allocation, which will not be corrected until the expiration of the next auto-bandwidth adjustment interval, thus possibly resulting in a large amount of data loss during such lag-time.

While under-utilization is not desirable, such a result may be acceptable when balanced with the increased burden that would be placed on the system in order to shorten the interval time period for decreasing the allocated bandwidth to reduce the under-utilization. However, regarding situations where the lag-time results in data loss, it is highly desirable to reduce such lag-time in order to prevent or reduce the possibility of such data loss.

Accordingly, embodiments of an auto-bandwidth adjustment system and algorithm are set forth herein to differentiate between upward and downward bandwidth adjustments in order to prevent or reduce data loss.

Figure 2:
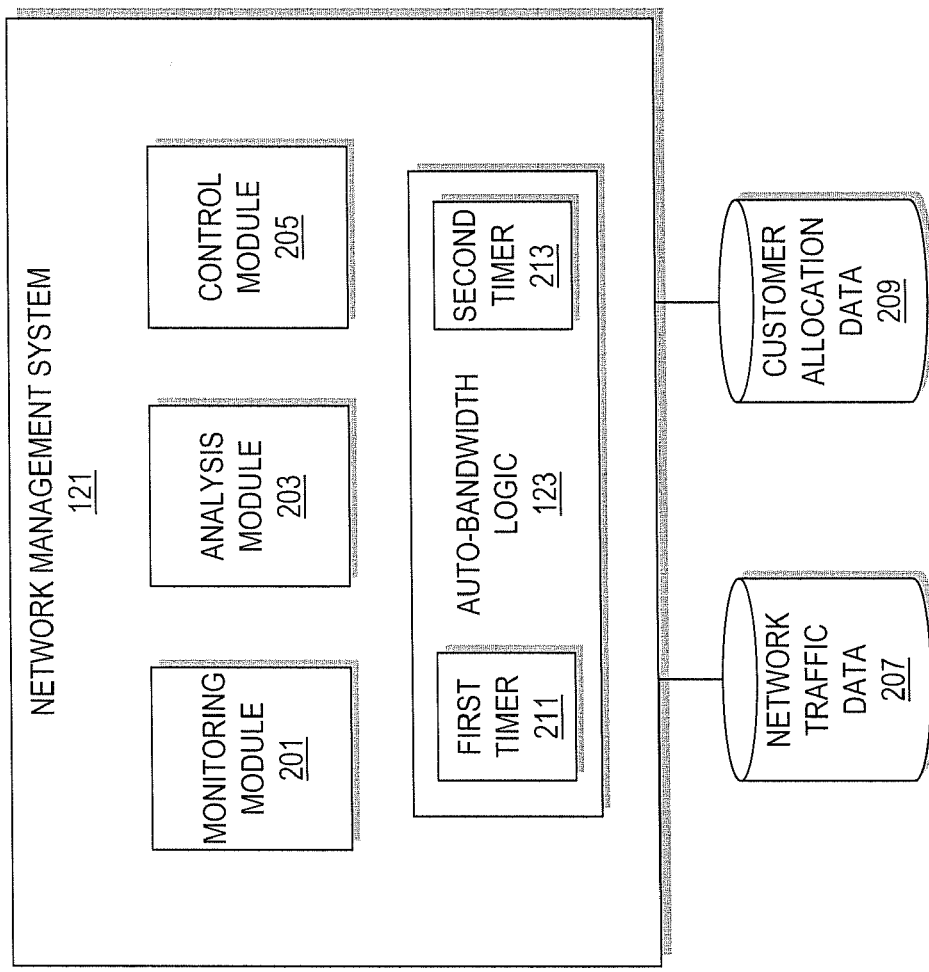
FIG. 2 is a schematic diagram of a network management system incorporating an auto-bandwidth logic used to adjust label-switched path tunnels, according to an exemplary embodiment.

FIG. 2 is a schematic diagram of a network management system 121 incorporating an auto-bandwidth logic 123 used to adjust label-switched path tunnels, according to an exemplary embodiment. The auto-bandwidth logic 123 (and/or auto-bandwidth logic 133, and/or auto-bandwidth logic 153) utilizes an auto-bandwidth adjustment system and algorithm discussed in the previous paragraph, and includes a first timer 211 and a second timer 213.

The network management system 121 includes a monitoring module 201, an analysis module 203, and a control module 205. Additionally, a network traffic data database 207 and a customer allocation data database 209 are provided either as components of the network management system 121 or as separate components that are accessible by the network management system 121.

The monitoring module 201 can be configured to collect data regarding the operation of the label switching network 101. For example, by monitoring one or more of label switched path tunnel 103, node 105, node 107, node 109, node 111, edge device 131, and/or edge device 151, the monitoring module can take samples of traffic flow rates throughout the network 101. For example, the monitoring module 201 can be used to sample traffic flow rates at regular intervals, or at plural interval periods using one or more of the timers 211 and 213. Note that while portions of the description herein describe the use of multiple timers (e.g., two), in fact, it is also possible to use a single timer, and then analyze the data for increases in traffic, each using a certain number of regular samplings and then analyze the data for decreases in traffic, each using other certain numbers of samplings (e.g., analyzing every sampling for increases, while analyzing every third sampling for decreases; thus for samplings taken every minute, then samplings taken at one minute, two minutes, three minutes, four minutes, five minutes, six minutes, . . . will be analyzed for increases in traffic, while samplings taken at three minutes, six minutes, . . . will be analyzed for decreases in traffic). The monitoring module 201 may also be able to monitor current network resources to determine, for example, current capacity, current resource problems, etc. The sampled traffic flow rates and other information collected by the monitoring module 201 can be stored in the network traffic data database 207 for later analysis.

The customer allocation data database 209 can be used to store various information related to the network and allocations of the network, for example, current bandwidth allocations for customers, current CDRs, current network resources, etc. The analysis module 203 can access both the network traffic data database 207 and the customer allocation data database 209 in order to perform an analysis of the data stored thereon. Additionally, the analysis module 203 can access or can include auto-bandwidth logic 123 in order to access and perform the auto-bandwidth algorithm therein.

The control module 205 can be configured to control any adjustments to the label switching network 101 that are determined using the auto-bandwidth algorithm.

Embodiments described herein include an auto-bandwidth algorithm that defines one or more trigger events that will cause an auto-bandwidth adjustment to occur based upon the sampled traffic flow rate data. The particular triggers used in the algorithm can vary from network to network, or customer to customer. One such trigger that can be used is a committed data rate (CDR) of the label-switched path (LSP). For example, the algorithm could be defined with a trigger such that if the sampled data exceeds the current CDR, then the auto-bandwidth algorithm performs a calculation to determine an adjustment value by which the LSP's CDR will be adjusted. The algorithm could also take into account certain defined minimum adjustment sizes, or other factors in order to determine whether or not to adjust the CDR at this time, and/or by how much the CDR should be adjusted at this time.

Figure 3:
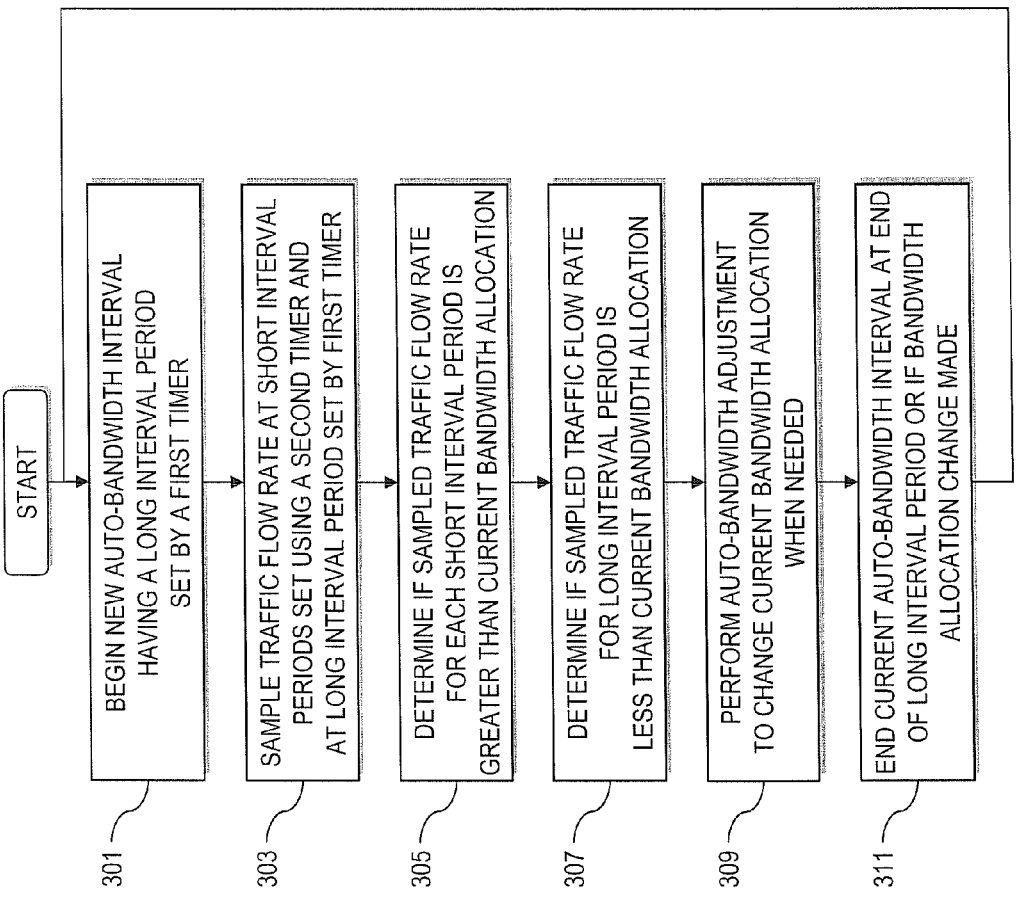
FIG. 3 is a flowchart of a process for automatically adjusting bandwidth allocations to reduce or prevent loss of data during fluctuations in traffic, according to an exemplary embodiment.

FIG. 3 is a flowchart of a process for automatically adjusting bandwidth allocations to reduce or prevent loss of data during fluctuations in traffic, according to an exemplary embodiment. Prior to starting such a process, the bandwidth allocation for the current interval will be at a level set by the network engineers or at a level determined by a previous auto-bandwidth operation. In step 301, a new auto-bandwidth interval is begun and has a long (i.e., long relative to the short interval periods discussed below) interval period set by a first timer. In step 303, sample traffic flow rate data will be gathered for analysis. In this step, the traffic flow rate will be sampled at short interval periods set by a second timer, and at the long interval period set by the first timer. As noted previously, while this description describes the use of two timers, this sampling can be performed using a single timer. In any case, it is preferable to set the short intervals so that plural short intervals equal the long interval. By way of illustration and not limitation, traffic data can be collected every 30 seconds for a total of three minutes, with the short intervals each being 30 seconds long and the long interval being three minutes long. In such an example, the samplings taken at 30 seconds, 60 seconds, 90 seconds, 120 seconds, 150 seconds, and 180 seconds would be the short interval samplings that are analyzed as described below, and the sampling taken at 180 seconds would be the long interval sampling that is analyzed as described below.

In step 305, as each of the short interval samplings are taken, they will each be analyzed to determine if the sampled traffic flow rate for each short period interval is greater than the current bandwidth allocation. In steps 309 and 311, if it is determined that auto-bandwidth adjustment is needed for any of the short interval samplings as determined by the auto-bandwidth adjustment algorithm, then the auto-bandwidth adjustment will be performed and the current auto-bandwidth interval will be ended and a new auto-bandwidth interval begun. In step 307, as the long interval sampling is taken, it will be analyzed to determine if the sampled traffic flow rate for the long period interval is greater than the current bandwidth allocation. In step 309, an auto-bandwidth adjustment will be performed to change the current bandwidth allocation if needed as determined using the auto-bandwidth adjustment algorithm. Then, in step 311, the current auto-bandwidth interval will end at the end of the long interval period, or if a bandwidth allocation change is made based on any of the short period interval samplings. At this stage, the process can then loop back to step 301 to begin a new auto-bandwidth interval.

Figure 4:
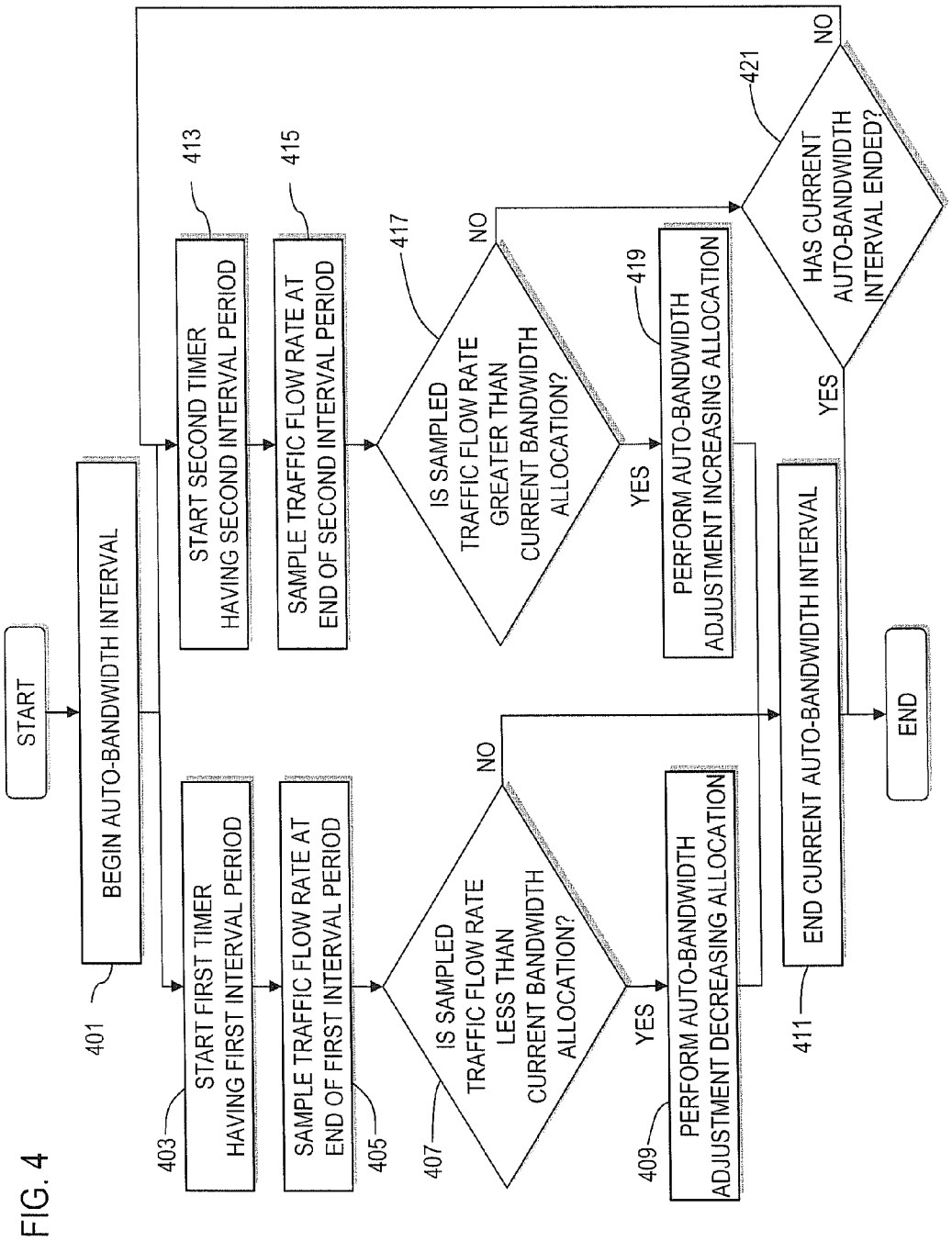
FIG. 4 is a flowchart of a process for automatically adjusting bandwidth allocations during an auto-bandwidth interval including using a first timer to sample and assess traffic flow rate decreases and a second timer to sample and assess traffic flow rate increases, according to an exemplary embodiment.

FIG. 4 is a flowchart of a process for automatically adjusting bandwidth allocations during an auto-bandwidth interval including using a first timer to sample and assess traffic flow rate decreases and a second timer to sample and assess traffic flow rate increases, according to an exemplary embodiment. The flowchart in FIG. 4 provides a process for automatically adjusting bandwidth allocations during an auto-bandwidth interval in greater detail than in FIG. 3.

In step 401 in FIG. 4, a new auto-bandwidth interval is begun. At the beginning of the new auto-bandwidth interval, a first timer is started having a first interval period in step 403, and a second timer is started having a second interval period in step 413. In this embodiment, the second interval period is set to be less than, and preferably a divisible unit of, the first interval period.

Following the process flow path from step 403, which runs concurrently with the flow path from step 413, in step 405 a sample of the traffic flow rate is taken at the end of the first interval period. In step 407, it is determined whether the sampled traffic flow rate is less than the current bandwidth allocation. If the sampled flow rate is less than the current bandwidth allocation in step 407, then the process will proceed to step 409 where an auto-bandwidth adjustment will be performed to decrease the bandwidth allocation using the auto-bandwidth adjustment algorithm. However, if the sampled flow rate is not less than the current bandwidth allocation in step 407, then the process will proceed to step 411 where the current bandwidth interval will end, but note that an increase in the bandwidth allocation may be performed prior to the end of the current bandwidth interval if so determined in step 419 as discussed below. Although not shown in this depiction, at this stage, a new auto-bandwidth interval can be begun if so desired.

Following the process flow path from step 413, in step 415 a sample of the traffic flow rate is taken at the end of the second interval period. (Note that since the second interval period is shorter than the first interval period, the process flow path following from step 413 may loop-around and be performed plural times during the first interval period.) In step 417, it is determined whether or not the sampled traffic flow rate is less than the current bandwidth allocation. If the sampled flow rate is greater than the current bandwidth allocation in step 417, then the process will proceed to step 419 where an auto-bandwidth adjustment will be performed to increase the bandwidth allocation using the auto-bandwidth adjustment algorithm. After performing step 419, then the process will proceed to step 411 where the current bandwidth interval will end. Although not shown in this depiction, at this stage, a new auto-bandwidth interval can be begun if so desired. However, if the sampled flow rate is not greater than the current bandwidth allocation in step 417, then the process will proceed to step 421, where it is determined whether or not the current auto-bandwidth interval has ended. If the current auto-bandwidth has not ended (e.g., where the first interval period has not expired, or an auto-bandwidth adjustment increasing bandwidth allocation has not been made), then the process will loop back to step 413 and the second timer will be started again. If however, the current auto-bandwidth interval has ended in step 421, then the process will end. Again, although not shown in this depiction, at this stage, a new auto-bandwidth interval can be begun if so desired.

Thus, traffic-engineered tunnels that carry metered traffic are advantageously provided with bandwidth allocations that can automatically be adjusted at intervals that are different for bandwidth increases, as compared to bandwidth decreases. By setting the intervals for bandwidth increase adjustments shorter than the intervals for bandwidth decrease adjustments, the auto-bandwidth adjustments have greater reaction time for bandwidth increases, thus reducing data losses, and have smoothed reactions for bandwidth decreases.

Such a system can prevent problems associated with a system in which auto-bandwidth adjustments occur at regular intervals, which is configured as a static setting, regardless of whether bandwidth is being increased or decreased. In such static systems, a situation can arise where, as the bandwidth increases during a normal day, the traffic-engineered tunnels increase in size; however, there may be some sampling periods where the bandwidth needs are momentarily diminished, which would cause the traffic-engineered tunnel to shrink in size during an otherwise busy portion of the day. As the traffic increases, the excess traffic above the bandwidth limit of the traffic engineered-tunnel may be discarded until the timer expires, and a new auto-bandwidth adjustment made increasing the size of the traffic-engineered tunnel.

By introducing two timers (or two time intervals) for auto-bandwidth adjustments on traffic-engineered tunnels, the above problems can be reduced or eliminated. One timer is used to set the interval at which increasing bandwidth adjustments can be made, and the other timer is used to set the interval at which decreasing bandwidth adjustments can be made. Such a system can be used, for example, in an MPLS network utilizing resource reservation protocol (RSVP) for traffic-engineered tunnel creation. However, this system can be used for any implementation that utilizes traffic-engineered-tunnels carrying sampled traffic. As the name suggests, RSVP permits network resources to be designated across a network to support particular Quality of Service (QoS) levels for traffic. Furthermore, Resource Reservation Protocol—Traffic Engineering (RSVP-TE) has been developed as an extension of the RSVP protocol for traffic engineering to provide, for example, the establishment of MPLS label switched paths, wherein network parameters, such as bandwidth, can be taken into account. RSVP and RSVP-TE are detailed in Internet Engineering Task Force (IETF) Request for Comment (RFC) 2205 and RFC 3209, respectively; both of which are incorporated herein by reference in their entireties.

In normal operation, a traffic-engineered tunnel with auto-bandwidth adjustment changes in size at specified intervals. The amount of bandwidth change for the traffic-engineered tunnel can be based on the bandwidth sample. Thus, bandwidth can change at every interval either increasing or decreasing based on the bandwidth traffic sampling. If the amount of traffic exceeds the current bandwidth level of the traffic-engineered tunnel, then the excess bandwidth may be discarded until the bandwidth of the traffic-engineered tunnel is increased in size, upon the expiration of the respective timer. The system slows down the decreases in size of the traffic-engineered tunnels, while enhancing the reaction of increases in size of the traffic-engineered tunnels. Thus, for example, if the "up timer" is set at one-minute intervals and the "down timer" is set at ten-minute intervals, as traffic increases throughout the day, the bandwidth increases will occur at one-minute intervals. However, even if there is a one-minute interval during the busy part of the day where the traffic decreases, the size of the traffic-engineered tunnel will not likely decrease, since it is sampled in ten-minute intervals. This system will thereby smooth out decreases in bandwidth throughout the day, and reduce occurrences of discarded traffic due to premature bandwidth reductions of traffic-engineered tunnels using auto-bandwidth adjustments.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
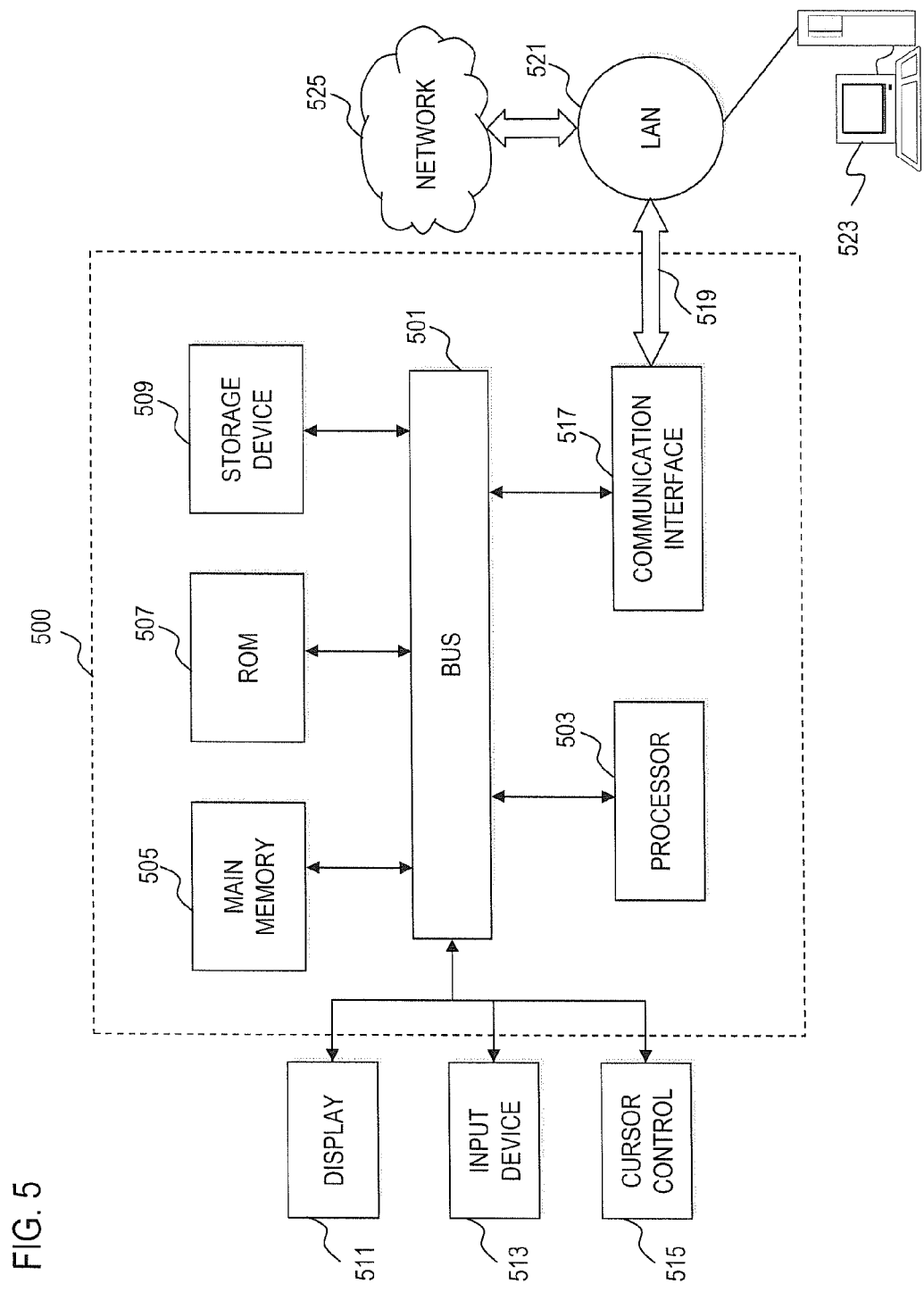
FIG. 5 is a diagram of a computer system that can be used to implement various exemplary embodiments.

FIG. 5 illustrates computing hardware (e.g., computer system) 500 upon which an embodiment according to the invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements.

The invention claimed is:

1. A method comprising:
    sampling, by a processor, traffic over a traffic-engineered tunnel at a first sampling interval period;
    sampling, by the processor, traffic over the traffic-engineered tunnel at a second sampling interval period running concurrently with the first sampling interval period, the second sampling interval period being shorter than the first sampling interval period;
    determining, by the processor, whether to increase bandwidth allocation of the traffic-engineered tunnel based on the sampled traffic taken using the second sampling interval period; and
    determining, by the processor, whether to decrease the bandwidth allocation based on the sampled traffic taken using the first sampling interval period.

2. The method according to claim 1, further comprising:
    adjusting, by the processor, the bandwidth allocation based on the determining steps.

3. The method according to claim 2, wherein adjustment of the bandwidth allocation is automatic based on analysis of the sampled traffic.

4. The method according to claim 1, wherein the first sampling interval period is set using a first timer, and wherein the second sampling interval period is set using a second timer.

5. The method according to claim 1, wherein the traffic-engineered tunnel is established over a label-switched path of a data network.

6. The method according to claim 5, wherein the label-switched path is established according to a communication protocol that reserves network resources of the data network for the label-switched path.

7. A system comprising:
    at least one memory;
    at least one processor,
    the at least one processor configured to:
        sample traffic over a traffic-engineered tunnel at a first sampling interval period,
        sample traffic over the traffic-engineered tunnel at a second sampling interval period running concurrently with the first sampling interval period, the second sampling interval period being shorter than the first sampling interval period;
        determine whether to increase bandwidth allocation of the traffic-engineered tunnel based on the sampled traffic taken using the second sampling interval period, and
        determine whether to decrease the bandwidth allocation based on the sampled traffic taken using the first sampling interval period.

8. The system according to claim 7, wherein the at least one processor is further configured to:
    adjust the bandwidth allocation based on determinations to increase bandwidth allocation or decrease bandwidth allocation.

9. The system according to claim 8, wherein the at least one processor is further configured to adjust automatically the bandwidth allocation based on analysis of the sampled traffic.

10. The system according to claim 7, further comprising:
    a first timer configured to set the first sampling interval period; and
    a second timer configured to set the second sampling interval period.

11. The system according to claim 7, wherein the traffic-engineered tunnel is established over a label-switched path of a data network.

12. The system according to claim 11, wherein the label-switched path is established according to a communication protocol that reserves network resources of the data network for the label-switched path.

13. A method comprising:
  setting, by a processor, a first timer for increasing bandwidth for a label-switched path;
  setting, by the processor, a second timer for decreasing bandwidth for the label-switched path;
  sampling traffic over the label-switched path over a first sampling interval period set by the first timer; and
  sampling traffic over the label-switched path over a second sampling interval period running concurrently with the first sampling period and being set by the second timer,
  wherein the second timer is set for a longer duration than the first timer.

14. The method according to claim 13, further comprising:
  determining, by the processor, a current bandwidth level of the label-switched path based on the sampled traffic of the label-switched path; and
  automatically adjusting, by the processor, the bandwidth based on the current bandwidth level according to the first timer and the second timer.

15. The method according to claim 13, wherein the label-switched path is established according to a communication protocol that reserves network resources of a data network for the label-switched path.

16. A system comprising:
  at least one memory;
  at least one processor;
  a first timer; and
  a second timer;
  the at least one processor configured to:
    set said first timer for increasing bandwidth for a label-switched path,
    set said second timer for decreasing bandwidth for the label-switched path,
    sample traffic over the label-switched path over a first sampling interval period set by the first timer, and
    sample traffic over the label-switched path over a second sampling interval period running concurrently with the first sampling interval period and being set by the second timer,
  wherein said second timer is set for a longer duration than said first timer.

17. The system according to claim 16, wherein the at least one processor is further configured to:
  determine a current bandwidth level of the label-switched path based on the sampled traffic of the label-switched path.

18. The system according to claim 17, wherein the at least one processor is further configured to:
  adjust automatically the bandwidth based on the current bandwidth level according to said first timer and said second timer.

19. The system according to claim 16, wherein the label-switched path is established according to a communication protocol that reserves network resources of a data network for the label-switched path.

20. A non-transitory computer-readable storage medium carrying one or more instructions which, when executed by one or more processors, cause an apparatus to perform at least the following steps:
  setting a first timer for increasing bandwidth for a label-switched path;
  setting a second timer for decreasing bandwidth for the label-switched path;
  sampling traffic over the label-switched path over a first sampling interval period set by the first timer; and
  sampling traffic over the label-switched path over a second sampling interval period running concurrently with the first sampling interval period and being set by the second timer,
  wherein said second timer is set for a longer duration than said first timer.

21. The non-transitory computer-readable storage medium according to claim 20, wherein the apparatus is caused further to perform determining a current bandwidth level of the label-switched path based on the sampled traffic of the label-switched path.

* * * * *